Jan. 15, 1963  H. E. MERRITT  3,073,622
TRAILER HITCH ARRANGEMENT
Filed Aug. 7, 1961
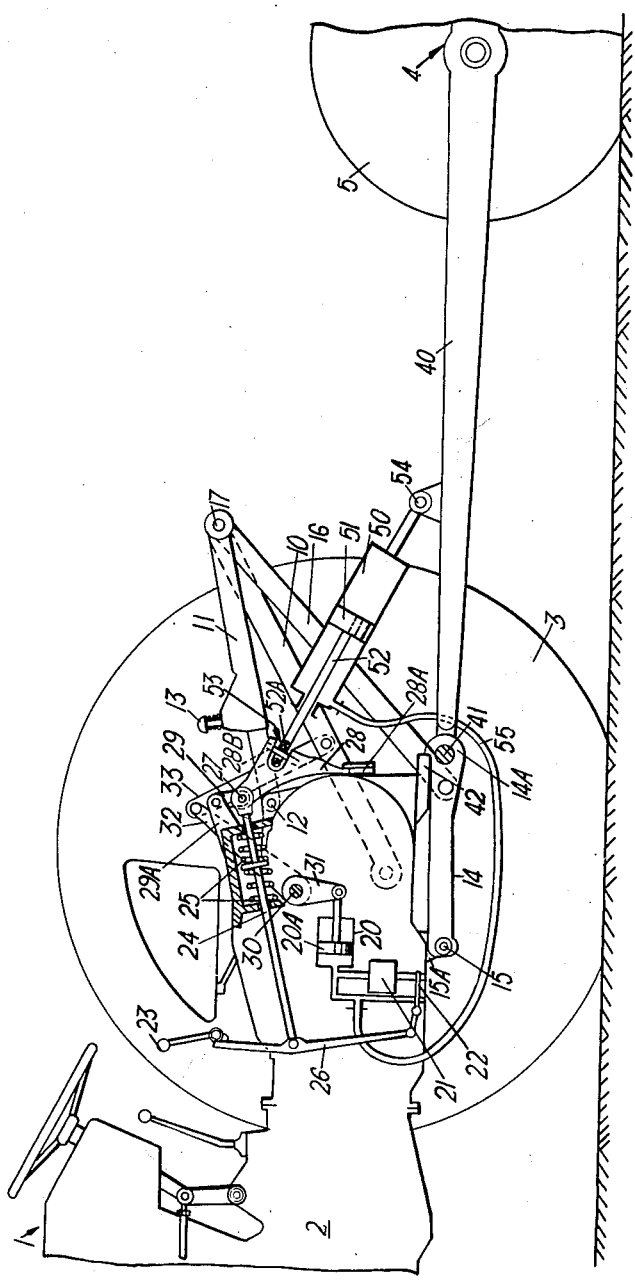
Inventor
HENRY EDWARD MERRITT
By
Wolfe, Hubbard, Voit & Osann
Attorneys

United States Patent Office 3,073,622
Patented Jan. 15, 1963

3,073,622
TRAILER HITCH ARRANGEMENT
Henry E. Merritt, Claverdon, England, assignor to Massey-Ferguson (United Kingdom) Limited, Coventry, England, a British company
Filed Aug. 7, 1961, Ser. No. 129,676
6 Claims. (Cl. 280—405)

The present invention relates to a trailer hitch for tractors and concerns, more particularly, a weight transfer arrangement for such hitches.

Modern agricultural tractors commonly embody hydraulically positioned implement linkages for automatic draft control. Through such linkages portions of the implement weight and the developed working load are transferred to the rear drive wheels of the tractor as a downwardly acting force that greatly increases the driving traction of the tractor. This draft control force transfer is adjustably set and automatically maintained as will be understood by those familiar with such well-known constructions, often identified as the "Ferguson system."

The primary aim of the present invention is to provide a trailer hitch arrangement for tractors which transfers a controlled portion of the trailer weight to the rear drive wheels of the tractor. More particularly, it is an object of the invention to provide a hitch arrangement of the above type that simply and economically adapts the standard tractor draft control hydraulic system for weight transfer from a trailer hitched to the tractor.

A further object is to provide a hitch arrangement as characterized above which maintains a selected amount of weight transfer from a trailer without limiting free articulation of the trailer hitch.

Other objects and advantages of the invention will become apparent upon reading the following detailed description and upon reference to the drawing, in which:

The single FIGURE shows a fragmentary longitudinal section, with portions broken away, of a trailer hitch arrangement embodying the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown a tractor 1 having a body 2 supported by rear driving wheels 3 and being coupled to a trailer 4 having ground wheels 5, only one each of the wheels 3 and 5 being illustrated. The tractor 1 is provided with a conventional three point hitch linkage normally associated with the "Ferguson system," but for the particular arrangement illustrated, the usual top link is removed leaving the laterally spaced lower draft links, of which only the link 10 is shown.

In place of the usual top link, there is provided a telescoping latch link 11 of a well-known type which is pivoted on a pin 12 received in lugs on the tractor body. The telescoping link 11 is arranged to latch in its compressed condition and a spring plunger 13 is provided for manually releasing the telescoping parts of the link so that it may be extended.

To provide a trailer coupling, a hook member 14 is pivoted at 15 to a bracket 15A formed on the rear underside of the tractor body 2. The coupling member 14 is connected by a pair of drop links 16 to a pivot pin 17 that interconnects the rear ends of the draft links 10 and the latch link 11.

The tractor power lift or hydraulic system includes a hydraulic ram 20 connected to the delivery side of a pump 21 and to a control valve 22. The control valve 22 is also connected to the suction side of the pump 21. The valve is partly under the control of the tractor operator through a manual control lever 23 and partly automatically controlled through a sensing member 24 which is spring positioned by a double acting, balance spring device 25. The hand lever 23 and the sensing member 24 both act on a floating valve control lever 26. Movement of the lower end of the lever 26 to the left in the drawing opens the pump 21 to the supply of fluid in the system, and movement of the lower end of the lever 26 to the right opens an exhaust port to dump fluid from the ram 20, as will be well-known to those acquainted with these systems.

The sensing member 24 is pivotally connected at 27 to a hitch coupling lever 28 whose toe 28A is resiliently anchored to the tractor body. The upper end of the lever 28 is held by suspension links 29 which are pivoted on lugs 29A formed with the tractor body. As will be understood by those skilled in the art, the usual top link of an implement hitch is normally connected to the lever 28 and, depending upon the nature of the implement hitched to the tractor, would exert a pushing or pulling force on the lever 28 that would result in longitudinal positioning of the sensing member 24.

The power lift system of the tractor also includes a rocking shaft 30 journalled in the tractor body and carrying an arm 31 that is connected to a piston 20A in the ram 20. Side arms 32 are also secured to the rocking shaft 30 and drop links 33 extend from each side arm to a respective draft link 10.

When the tractor 1 is to be used to tow the trailer 4, the tractor power lift system is used to effect the coupling operation. More specifically, the trailer 4 includes a drawbar 40 having a coupling eye 41 which is manually placed into engagement with a hook 14A on the coupling member 14 when the latter is swung downwardly substantially to ground level. The tractor driver, by manipulating the hand control lever 23, causes the ram 20 to rotate the rock shaft 30 so as to raise the coupling member 14 and the connected drawbar 40. During this movement, the latch link 11 contracts until a position is reached in which the latch of the link 11 automatically engages. When this occurs, hydraulic pressure is no longer needed at the ram 20 since the latched link 11 assumes full support of the hooked trailer coupling. When the parts have reached this fully coupled position, illustrated in the drawing, the mouth of the hook 14A is closed by a lug 42 formed on the tractor body 2. A single hitch is thus provided which gives free swinging, lateral articulation to the trailer 4 as well as permitting up and down movement of the drawbar 40 without the possibility of the drawbar becoming disengaged from the tractor.

In accordance with the invention, a selected portion of the trailer weight is transferred to the tractor by a hydraulic tension link consisting of a single acting cylinder 50 containing a piston 51 mounted on a piston 52, with the cylinder 50 being pivoted at 54 to the drawbar 40 and the rod 52 being pivotally coupled by a universal joint 53 to the hitch control lever 28. Hydraulic fluid is supplied to the cylinder 50 through a conduit 55 which is connected to the hydraulic system of the tractor at a point between the valve 22 and the hydraulic ram 20.

It will be seen that the cylinder 50, piston 51 and rod 52 constitute a hydraulic actuator which is contractible upon the supplying of hydraulic fluid under pressure through the conduit 55.

The universal joint 53 is preferably formed as an eye 52A on the rod 52 that embraces a pin 28B anchored between lugs on the lever 28. This joint permits the cylinder 50 to pivot vertically to a small extent and laterally to a considerable extent so as to follow the trailer drawbar 40. It will be noted that the universal joint 53 is positioned substantially on a vertical line passing upwardly through the hook 14A and eye 41 coupling between the drawbar 40 and the tractor.

The operation of the weight transfer arrangement can now be understood. Assuming that the parts are positioned as shown in the drawing in readiness for forward driving, the tractor operator initially sets the hand control lever 23 in a selected position so that the control valve 22 admits oil to the pump 21 with the result that oil under pressure is delivered through the conduit 55 to the cylinder 50. Pressure in the cylinder tends to contract the tension link so as to exert a force on the drawbar 40 tending to lift the trailer about the coupling hook 14A. Contraction of the cylinder also pulls the lever 28 clockwise about its toe 28A so as to move the sensing member 24 rearwardly against the resistance of the balance spring device 25 with the result that the valve 22 is returned to its closed position.

The effect of the above condition of the parts is that a portion of the weight of the trailer is transferred as a downward force to the rear driving wheels 3 of the tractor. The amount of this weight transfer is predetermined by the setting of the hand lever 23, and thus the tractor operator can adjust the magnitude of the weight transfer.

As the tractor moves forward, undulating ground will cause the trailer to rise and fall relative to the tractor. When the trailer rises, the drawbar 40 swings upwardly so as to contract the tension link and reduce the pressure in the cylinder 50 on the piston 51. This will allow the sensing member 40 to move forwardly under the force of the balance spring device 25 so as to open the control valve 22 and transfer fluid to the cylinder. The valve 22 remains open to direct more fluid to the cylinder 50 until the tension in the hydraulic actuator link is restored to give the predetermined weight transfer, at which point the valve 22 again closes in the manner described above.

Conversely, when the trailer 4 falls relative to the tractor 1, the fluid trapped in the cylinder 50 creates an increase in the cylinder hydraulic pressure as the actuator link is extended and this draws the sensing member 24 rearwardly to shift the control valve 22 to its exhaust position. As a result, fluid flows from the cylinder 50 until the transferred weight again reaches its predetermined magnitude, at which point the valve again closes.

It will therefore be apparent that the amount of weight transferred from the trailer 4 to the tractor 1 will remain constant despite the rise and fall of the trailer relative to the tractor. The amount of weight transferred can, of course, be adjusted by appropriately positioning the control lever 23.

Since the point of articulation between the hydraulic tension link, i.e., the universal joint 53, is substantially directly above the single point of articulation between the drawbar 40 and the tractor hook 14A, the position of the piston 51 in the cylinder 50 remains virtually unaffected throughout a considerable range of lateral articulation of the trailer relative to the tractor. It may also be understood that since the rise and fall of the trailer relative to the tractor is not of great magnitude, the cylinder and piston actuator may be of compact overall dimensions.

I claim as my invention:

1. A trailer hitch arrangement for tractors having draft control hydraulic systems including a spring positioned sensing member operating a valve for supplying or dumping hydraulic fluid comprising, in combination, a coupling mounted on said tractor, a trailer drawbar releasably secured to said coupling for lateral free swinging movement, a hydraulically contractible link coupled between said drawbar and said sensing member, and means hydraulically connecting said link to said valve so that fluid supplied by said valve contracts said link and fluid dumped by said valve extends said link.

2. A trailer hitch arrangement for tractors having draft control hydraulic systems including a spring positioned sensing member operating a valve for supplying or dumping hydraulic fluid comprising, in combination, a coupling mounted on said tractor, a trailer drawbar releasably secured to said coupling for lateral free swinging movement, a link coupled between said drawbar and said sensing member, said link including a single acting hydraulic cylinder arranged to contract the link upon an increase in fluid pressure, and means hydraulically connecting said cylinder to said valve so that said sensing member contracts and extends said link.

3. A trailer hitch arrangement for a tractor having a draft control hydraulic system including a spring positioned sensing member operating a valve for supplying a dumping hydraulic fluid comprising, in combination, a coupling mounted on said tractor, a trailer drawbar releasably secured to said coupling for lateral free swinging movement, a hydraulically contractible link coupled between said drawbar and said sensing member, said drawbar and said link being coupled to said tractor at points lying one above the other on a substantially vertical line, and means hydraulically connecting said link to said valve so that fluid supplied by said valve contracts said link and fluid dumped by said valve extends said link.

4. A tractor-trailer combination comprising, in combination, a hydraulic ram mounted in said tractor, a pump in said tractor for supplying fluid to said ram, a control valve connected to the suction side of said pump, said ram being coupled to the delivery side of said pump and to said valve, a spring positioned sensing member mounted on said tractor, a settable control lever mounted on said tractor, means connecting said sensing member and said control lever to said valve for joint control of said ram, a coupling mounted on said tractor, a trailer drawbar releasably secured to said coupling for lateral free swinging movement, a hydraulically contractible link coupled between said drawbar and said sensing member, and means hydraulically connecting said link to a point between said ram and said valve so as to transfer a selected amount of trailer weight to the tractor.

5. A tractor-trailer combination comprising, in combination, a hydraulic ram mounted in said tractor, a pump in said tractor for supplying fluid to said ram, a control valve connected to the suction side of said pump, said ram being coupled to the delivery side of said pump and to said valve, a spring positioned sensing member mounted on said tractor, means connecting said sensing member to said valve for control of said ram, a coupling mounted on said tractor, a trailer drawbar releasably secured to said coupling for lateral free swinging movement, a link coupled between said drawbar and said sensing member, said link including a single acting hydraulic cylinder arranged to contract the link upon an increase in fluid pressure, and means hydraulically connecting said cylinder to a point between said ram and said valve so as to transfer a selected amount of trailer weight to the tractor.

6. A tractor-trailer combination comprising, in combination, a hydraulic ram mounted in said tractor, a pump in said tractor for supplying fluid to said ram, a control valve connected to the suction side of said pump, said ram being coupled to the delivery side of said pump and to said valve, a spring positioned sensing member mounted on said tractor, a settable control lever mounted on said tractor, means connecting said sensing member and said control lever to said valve for joint control of said ram, a coupling mounted on said tractor, a trailer drawbar releasably secured to said coupling for lateral free swinging movement, a hydraulically contractible link coupled between said drawbar and said sensing member, said drawbar and said link being coupled to said tractor at points lying one above the other on a substantially vertical line, and means hydraulically connecting said link to a point between said ram and said valve so as to transfer a selected amount of trailer weight to the tractor.

References Cited in the file of this patent

UNITED STATES PATENTS

| | | | |
|---|---|---|---|
| 2,405,980 | Sands | Aug. 20, | 1946 |
| 2,627,796 | Bunting | Feb. 10, | 1953 |
| 2,779,604 | Voegeli | Jan. 29, | 1957 |

FOREIGN PATENTS

| | | | |
|---|---|---|---|
| 447,885 | Italy | May 2, | 1949 |